United States Patent
Okamoto et al.

(10) Patent No.: US 6,258,922 B1
(45) Date of Patent: Jul. 10, 2001

(54) PROCESS FOR PRODUCING POLYCARBONATE AND OPTICAL-DISK SUBSTRATE

(75) Inventors: Masaya Okamoto; Mitsunori Ito, both of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/582,195

(22) PCT Filed: Jan. 8, 1999

(86) PCT No.: PCT/JP99/00037

§ 371 Date: Jun. 29, 2000

§ 102(e) Date: Jun. 29, 2000

(87) PCT Pub. No.: WO99/36458

PCT Pub. Date: Jul. 22, 1999

(30) Foreign Application Priority Data

Jan. 13, 1998 (JP) .................................................. 10-4400

(51) Int. Cl.⁷ .................................................. C08G 64/00
(52) U.S. Cl. .............................................. 528/196; 528/198
(58) Field of Search ...................................... 528/196, 198

(56) References Cited

FOREIGN PATENT DOCUMENTS

| 2-155922 | 6/1990 | (JP) . |
| 7-207016 | 8/1995 | (JP) . |
| 10-289482 | 10/1998 | (JP) . |
| 10-302312 | 11/1998 | (JP) . |

*Primary Examiner*—Terressa M. Boykin
(74) *Attorney, Agent, or Firm*—Oblon, Spivak, McClelland, Maier & Neustadt, P.C.

(57) ABSTRACT

In producing polycarbonates through transesterification of a dicarbonate with a dihydroxy compound, a compound having a specific branched structure and serving as a chain terminator, such as 4-(1,1,3,3-tetramethylbutyl)phenol, is added to the reaction system. The polycarbonates produced in the process are molded into optical-disk substrates. The process provides polycarbonates having well-balanced fluidity and impact resistance, without requiring toxic phosgene as the starting material. The optical-disk substrates as obtained by molding the polycarbonates produced in the process have reduced birefringence and improved transcriptional ability.

12 Claims, No Drawings

PROCESS FOR PRODUCING POLYCARBONATE AND OPTICAL-DISK SUBSTRATE

TECHNICAL FIELD

The present invention relates to a process for producing polycarbonates with well-balanced fluidity and impact resistance, and to optical-disk substrates as obtained by molding the polycarbonates produced in the process.

BACKGROUND ART

Polycarbonate resins are used for substrates for optical information-recording media on which information data are written, read or rewritten by the use of laser rays, including, for example, audio disks, laser disks, optical memory disks, magnet optical disks, etc, because the polycarbonate resins have good moldability, good transparency, good heat resistance and good mechanical properties. In particular, the substrates for DVDs (digital video disks or digital versatile disks) shall be thinner than those for ordinary CDs. Therefore, polycarbonates for substrates for DVDs are required to have good fluidity so that they could satisfy the requirements of reduced birefringence, good transcriptional ability and good cracking resistance in molding. To increase their fluidity, polycarbonates may be so controlled as to have a lowered molecular weight. However, the problem with polycarbonates having a lowered molecular weight is that their impact resistance is poor. Therefore, polycarbonates for DVD substrates are required to have well-balanced and improved fluidity and impact resistance.

For producing polycarbonates, known are a method of directly reacting a dihydroxy compound such as a diphenol or the like with phosgene (interfacial polycondensation), and a method of transesterifying a dicarbonate with a dihydroxy compound such as a diphenol or the like in a melt phase (melt polymerization). We, the present inventors have proposed DVD substrates produced through interfacial polycondensation (see Japanese Patent Laid-Open No. 276037/1990).

However, the DVD substrates proposed are problematic in that the interfacial polycondensationmethod for them requires toxic phosgene as one reactant and is therefore unfavorable. In addition, although their properties are good in some degree, they are not yet on the satisfactory level.

One object of the present invention is to provide a process for producing polycarbonates having well-balanced fluidity and impact resistance, without requiring toxic phosgene as the reactant. Another object of the invention is to provide optical-disk substrates with reduced birefringence and improved transcriptional ability, by molding the polycarbonates produced in the process.

DISCLOSURE OF THE INVENTION

We, the present inventors have found that, when a dicarbonate is transesterified with a dihydroxy compound to produce a polycarbonate in the presence of a chain terminator having a specific structure, then the polycarbonate produced can have well-balanced fluidity and impact resistance. On the basis of this finding, we have completed the invention.

Specifically, the invention provides a process for producing polycarbonates, and optical-disk substrates, which are as follows:

1. A process for producing a polycarbonate, which comprises transesterifying a dicarbonate with a dihydroxy compound in the presence of a compound having a structure of the following general formula (1) and serving as a chain terminator:

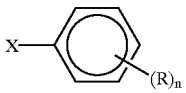

(1)

wherein X represents —OH, —COOH, —COCl or —NH$_2$; R represents an alkyl group having a branched structure with from 5 to 20 carbon atoms; and n indicates an integer of from 1 to 5.

2. The process for producing a polycarbonate of above 1, wherein the transesterification of a dicarbonate with a dihydroxy compound is effected in the presence of at least one catalyst selected from the group consisting of nitrogen-containing organic basic compounds and phosphorus-containing basic compounds.

3. A process for producing a polycarbonate, which comprises preparing a polycarbonate prepolymer through prepolymerization of a dihydroxy compound with a dicarbonate followed by polymerizing the resulting prepolymer in a solid phase or in a swollen solid phase in the presence of a compound having a structure of the following general formula (1) and serving as a chain terminator:

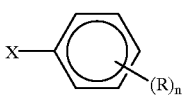

(1)

wherein X represents —OH, —COOH, —COCl or —NH$_2$; R represents an alkyl group having a branched structure with from 5 to 20 carbon atoms; and n indicates an integer of from 1 to 5.

4. The process for producing a polycarbonate of above 3, wherein the prepolymerization of a dihydroxy compound with a dicarbonate to give a polycarbonate prepolymer followed by the polymerization of the resulting prepolymer in a solid phase or in a swollen solid phase is effected in the presence of at least one catalyst selected from the group consisting of nitrogen-containing organic basic compounds and phosphorus-containing basic compounds.

5. The process for producing a polycarbonate of above 2 or 4, wherein the phosphorus-containing basic compounds are quaternary phosphonium salts.

6. An optical-disk substrate as produced by molding the polycarbonate prepared in the process of any one of above 1 to 5.

7. The optical-disk substrate of above 6, which is for DVDs (digital video disks or digital versatile disks).

BEST MODES OF CARRYING OUT THE INVENTION

The invention is described in detail hereinunder.
1. Process for Producing Polycarbonates:
(1) Starting Materials:
(A) Dihydroxy Compounds:

For example, aromatic dihydroxy compounds and aliphatic dihydroxy compounds are mentioned, and at least one selected from them is used in the invention.

As examples of the aromatic dihydroxy compounds usable as the component (A), mentioned are those of a general formula (2):

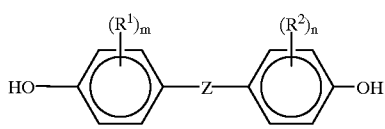
(2)

In formula (2), $R^1$ and $R^2$ each represent a halogen atom such as a fluorine, chlorine, bromine or iodine atom, or an alkyl group having from 1 to 8 carbon atoms such as a methyl, ethyl, n-propyl, isopropyl, n-butyl, isobutyl, sec-butyl, t-butyl, pentyl, hexyl, cyclohexyl, heptyl or octyl group. $R^1$ and $R^2$ may be the same or different ones. Plural $R^1$'s, if any, may be the same or different ones; and plural $R^2$'s, if any, may be the same or different ones. m and n each represent an integer of from 0 to 4. Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a bond of —S—, —SO—, —SO$_2$—, —O— or —CO—, or a bond of the following formula (3) or (4):

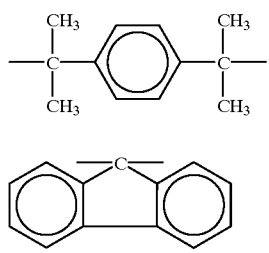
(3)

(4)

The alkylene group having from 1 to 8 carbon atoms and the alkylidene group having from 2 to 8 carbon atoms include, for example, methylene, ethylene, propylene, butylene, pentylene, hexylene, ethylidene and isopropylidene groups. The cycloalkylene group having from 5 to 15 carbon atoms and the cycloalkylidene group having from 5 to 15 carbon atoms include, for example, cyclopentylene, cyclohexylene, cyclopentylidene and cyclohexylidene groups.

Concretely, the compounds include hydroquinone, 4,4'-dihydroxydiphenyl, bis(4-hydroxyphenyl)alkanes, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) ketone, 9,9-bis(4-hydroxyphenyl)fluorene and their halide derivatives. Of those, preferred is 2,2-bis(4-hydroxyphenyl)propane (bisphenol A). One or more of the compounds mentioned above are suitably selected and used as the dihydroxy compounds for the component (A).

(B) Dicarbonates:

Various types of dicarbonates are usable in the invention. For example, used is at least one selected from the group consisting of diaryl carbonates, dialkyl carbonates and alkylaryl carbonates.

The diaryl carbonates usable for the component (B) include compounds of a general formula (5):

(5)

wherein $Ar^1$ and $Ar^2$ each represent an aryl group, and these may be the same or different ones;
and compounds of a general formula (6):

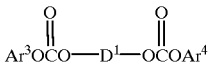
(6)

wherein $Ar^3$ and $Ar^4$ each represent an aryl group, and these may be the same or different ones; and $D^1$ represents a residue of an aromatic dihydroxy compound of those noted above from which two hydroxyl groups are removed.

The dialkyl carbonates include compounds of a general formula (7):

(7)

wherein $R^3$ and $R^4$ each represent an alkyl group having from 1 to 6 carbon atoms or a cycloalkyl group having from 4 to 7 carbon atoms, and these may be the same or different ones;
and compounds of a general formula (8):

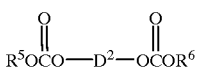
(8)

wherein $R^5$ and $R^6$ each represent an alkyl group having from 1 to 6 carbon atoms or a cycloalkyl group having from 4 to 7 carbon atoms, and these may be the same or different ones; and $D^2$ represents a residue of an aromatic dihydroxy compound of those noted above from which two hydroxyl groups are removed.

The alkylaryl carbonates include compounds of a general formula (9):

(9)

wherein $Ar^5$ represents an aryl group; and $R^7$ represents an alkyl group having from 1 to 6 carbon atoms or a cycloalkyl group having 4 carbon atoms;
and compounds of a general formula (10):

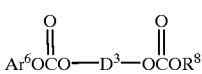
(10)

wherein $Ar^6$ represents an aryl group; $R^8$ represents an alkyl group having from 1 to 6 carbon atoms or a cycloalkyl group having from 4 to 7 carbon atoms; and $D^3$ represents a residue of an aromatic dihydroxy compound of those noted above from which two hydroxyl groups are removed.

One or more of the compounds mentioned above are suitably selected and used as the dicarbonates for the component (B). Of those compounds noted above, preferred is diphenyl carbonate.

(C) Chain Terminators:

In the invention, a chain terminator selected from compounds of the following formula (1) must be used.

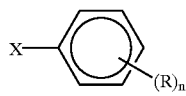

(1)

wherein X represents —OH, —COOH, —COCl or —NH$_2$; R represents an alkyl group having a branched structure with from 5 to 20 carbon atoms; and n indicates an integer of from 1 to 5.

Concretely, the compounds include 4-(1,1,3,3-tetramethylbutyl)phenol, 4-(3,5-dimethylheptyl)phenol, 2-(3,5-dimethylheptyl)phenol, p-tert-amylphenol, 3,5,5-trimethylhexanoic acid, 3,5,5-trimethylhexanoic acid, 3,5,5-trimethylhexanoic acid chloride, 2-hexyldecanoic acid, etc. Of those, preferred is 4-(1,1,3,3-tetramethylbutyl)phenol, that is, p-tert-octylphenol. One or more these chain terminators may be used either singly or as combined. If desired, the chain terminator of formula (1) may be combined with any others, such as p-tert-butylphenol, p-cumylphenol, etc.

(D) Branching Agents:

Compounds having at least three functional groups may be used as a branched agent with no specific limitation. For example, they include 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucinol, trimellitic acid, isatin-bis(o-cresol), β-resorcylic acid, etc.

Also usable are tetraphenols such as 1,1,2,2-tetra(4-hydroxyphenyl)ethane, 1,1,3,3-tetra(4-hydroxyphenyl)propane, α,α,α',α'-tetra(4-hydroxyphenyl)p-xylene, 1,1,2,2-tetra(3-methyl-4-hydroxyphenyl)ethane, α,α,α',α'-tetra(3-methyl-4-hydroxyphenyl)p-xylene, α,α'-dimethyl-α,α,α',α'-tetra(4-hydroxyphenyl)-p-xylene, etc.

One or more these branching agents may be used either singly or as combined.

(2) Catalysts:

The reaction of the dihydroxy compound with the dicarbonate is effected preferably in the presence of a catalyst. The catalyst is not specifically defined, but preferred are nitrogen-containing basic compounds and phosphorus-containing basic compounds. One or more of these compounds may be used as the catalyst either singly or as combined.

<1> Various types of nitrogen-containing organic basic compounds are employable herein with no specific limitation. For example, employable are aliphatic tertiary amine compounds such as trimethylamine, triethylamine, tripropylamine, tributylamine, tripentylamine, trihexylamine, dimethylbenzylamine, etc.; aromatic tertiary amine compounds such as triphenylamine, etc.; and nitrogen-containing heterocyclic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylaminoimidazole, 2-methoxyimidazole, 2-mercaptoimidazole, aminoquinoline, diazabicyclooctane (DABCO), etc. In addition, further employable are quaternary ammonium salts of a general formula (11):

(11).

In formula (11), R$^9$ represents an organic group, for example, an alkyl or cycloalkyl group such as a methyl, ethyl, propyl, butyl, pentyl, hexyl, octyl or cyclohexyl group, an aryl group such as a phenyl, tolyl, naphthyl or biphenyl group, or an arylalkyl group such as a benzyl group. Four R$^9$'s may be the same or different ones; and two of them may be bonded to each other to form a cyclic structure. X$^1$ represents a halogen atom, a hydroxyl group, or BR$_4$, in which R represents a hydrogen atom, or a hydrocarbon group such as an alkyl or aryl group, and four R's may be the same or different ones.

Examples of the quaternary ammonium salts include, for example, ammonium hydroxides having alkyl, aryl and/or alaryl groups, such as tetramethylammonium hydroxide, tetraethylammonium hydroxide, tetrabutylammonium hydroxide, trimethylbenzylammonium hydroxide, etc.; and basic salts such as tetramethylammonium borohydride, tetrabutylammonium borohydride, tetrabutylammonium tetraphenyl borate, tetramethylammonium tetraphenyl borate, etc.

Of the nitrogen-containing organic basic compounds noted above, preferred are the quaternary ammonium salts of formula (I), concretely such as tetramethylammonium hydroxide, tetrabutylammonium hydroxide, tetramethylammonium borohydride, and tetrabutylammonium borohydride, since they have high catalytic activity and since they are easily pyrolyzed and hardly remain in the polymers produced. Of those, especially preferred is tetramethylammonium hydroxide.

One or more of these nitrogen-containing organic basic compounds are employable herein either singly or as combined.

<2> The phosphorus-containing basic compounds usable herein include, for example, tri-valent phosphorus compounds, tetra-valent phosphorus compounds, quaternary phosphonium salts, etc. Of those, preferred are quaternary phosphonium salts. Various quaternary phosphonium salts are usable with no specific limitation. For example, preferably used are compounds of general formulae (12) and (13):

(12).

(13).

In formulae (12) and (13), R$^{10}$ represents an organic group. The organic group includes, for example, an alkyl or cycloalkyl group such asamethyl, ethyl, propyl, butyl, pentyl, hexyl, octyl or cyclohexyl group; an aryl group such as aphenyl, tolyl, naphthyl or biphenyl group; and an arylalkyl group such as a benzyl group. Four R$^{10}$'s may be the same or different ones, or two of them may be bonded to each other to form a cyclic structure. X$^1$ represents a group capable of forming a mono-valent anion, such as a halogen atom, a hydroxyl group, an alkyloxy group, an aryloxy group, R'COO, HCO$_3$, (R'O)$_2$P(=O)O, BR"$_4$ or the like. In those, R' represents a hydrocarbon group such as analkyl group, an aryl group or the like, and two (R'O) s may be the same or different ones. R" represents a hydrogen atom, or a hydrocarbon group such as an alkyl group, an aryl group or the like, and four R"s may be the same or different ones. Y$^1$ represents a group capable of forming a di-valent anion, such as CO$_3$ or the like.

The quaternary phosphonium salts include, for example, tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl) phosphonium diphenyl phosphate, triphenylbutylphosphonium phenolate, triphenylbutylphosphonium tetraphenyl borate, isopropyltrimethylphosphonium hydroxide, cyclohexyltriphenylphosphonium chloride, 1,1,1-triphenylmethyltriethylphosphonium acetate, bis (isopropyltriethylphosphonium) carbonate, etc.

Except the compounds of formulae (12) and (13) noted above, also usable herein are bis-tetraphenylphosphonium salt of 2,2-bis(4-hydroxyphenyl)propane, and ethylenebis(triphenylphosphonium) dibromide, trimethylenebis(triphenylphosphonium)-bis(tetraphenyl borate), etc.

Of the quaternary phosphonium salts noted above, preferred are tetrabutylphosphonium tetraphenyl borate, tetraethylphosphonium tetraphenyl borate, tetraphenylphosphonium tetraphenyl borate and cyclohexyltriphenylphosphonium tetraphenylborate, as their catalytic activity is well balanced with the quality of the polycarbonates produced in the presence of them.

(3) Production of Polycarbonates:

Preferred embodiments of the process for producing polycarbonates of the invention and the conditions for them are described concretely hereunder.

<1> Process not Including Prepolymerization:

A dicarbonate for the component (B) is transesterified with a dihydroxy compound for the component (A) in a ratio of the dicarbonate to the dihydroxy compound falling between 0.9 and 1.5 by mol. Depending on the condition for the transesterification between them, the ratio will preferably fall between 0.98 and 1.20 by mol. It is desirable that the amount of the chain terminator to be in the transesterification system falls between 0.05 and 10 mol % of the dihydroxy compound of the component (A), as the polycarbonates produced could have well-balanced impact resistance and fluidity.

All the necessary amount of the chain terminator may be previously put into the reaction system; or alternatively, a part thereof may be previously put into it, and the remaining part may be added thereto after the reaction has started. Apart from the cases, all the necessary amount of the chain terminator may be added to the system after the transesterification between the dicarbonate of the component (B) with the dihydroxy compound of the component (A) has started and has progressed to some degree.

The amount of the catalyst to be added to the reaction system may fall generally between $10^{-8}$ and $10^{-1}$ mols, but preferably between $10^{-7}$ and $10^{-2}$ mols, more preferably between $10^{-6}$ and $10^{-3}$ mols, relative to one mol of the starting dihydroxy compound of the component (A). If its amount added is smaller than $10^{-8}$ mols, the catalyst could not exhibit its function; but if larger than $10^{-1}$ mols, the physical properties, especially the heat resistance and the hydrolysis resistance of the final product, polycarbonate will be poor.

The temperature for the transesterification is not specifically defined, but may fall generally between 100 and 330° C., preferably between 180 and 300° C. More preferably, the reaction temperature is gradually elevated up to 180 to 300° C. in progress of the reaction. If the transesterification temperature is lower than 100° C., the reaction speed will be low; but if higher than 330° C., such high temperatures are unfavorable as often causing side reactions or often causing the problem of coloration of the polycarbonates produced. The reaction pressure will be settled, depending on the vapor pressure of the monomers used and the reaction temperature, but should not be specifically defined. Anyhow, the reaction pressure may be so settled that the reaction could progress efficiently under the settled pressure. In general but in many cases, the reaction system will be kept under atmospheric pressure (normal pressure) or increased pressure that falls between 1 and 50 atmospheric pressures (760 and 38,000 Torr) in the initial stage of the reaction, and will be kept under reduced pressure in the latter stage of the reaction, preferably falling between 0.01 and 100 Torr in the final stage thereof.

The reaction may be continued until the product, polycarbonate could have the intended molecular weight, and its time may fall generally between 0.2 and 10 hours or so.

The transesterification is effected in melt generally in the presence of an inert solvent. If desired, the amount of the inert solvent to be in the system may fall between 1 and 150% by weight of the polycarbonate to be produced. The inert solvent includes, for example, aromatic compounds such as diphenyl ether, diphenyl ether halides, benzophenone, polyphenyl ether, dichlorobenzene, methylnaphthalene, etc.; cycloalkanes such as tricyclo(5,2,10)decane, cyclooctane, cyclodecane, etc. Also if desired, the reaction may be effected in an inert gas atmosphere. Various types of inert gases are employable for the reaction, including, for example, gases such as argon, carbon dioxide, dinitrogen monoxide, nitrogen, etc.; chlorofluorohydrocarbons; alkanes such as ethane, propane, etc.; alkenes such as ethylene, propylene, etc. Further if desired, an antioxidant may be added to the reaction system.

In progress of the reaction, phenols, alcohols or their esters from the dicarbonate reacted, and also the inert solvent used are discharged from the reactor, and those discharges could be separated, purified and recycled. Preferably, therefore, the reactor is equipped with an apparatus for removing the discharges. The reaction may be effected either batchwise or continuously, for which any desired apparatus can be used. For the continuous reaction, it is desirable to use at least two reactors and to define the reaction condition for each reactor in the manner noted above. The material and the structure of the reactors to be used are not specifically defined, so far as they are provided with an ordinary stirring mechanism. However, it is desirable that the reactor for the latter stage of reaction is provided with a high-performance stirring mechanism, since the viscosity of the reaction system increases in that stage. The shape of the reactors is not also specifically defined, and any of tank reactors or extrusion reactors are employable herein.

After the transesterification, it is desirable that the reaction product is subjected to heat treatment at a temperature not lower than the decomposition point of the catalyst used, preferably at around 300° C. or so to pyrolyze and remove the catalyst. This is for improving the quality of the polycarbonate produced, for example, for preventing the polycarbonate from being colored with the catalyst.

<2> Process Including Prepolymerization:

This comprises prepolymerizing the starting compounds, (A) a dihydroxy compound and (B) a dicarbonate or phosgene such as those mentioned above, optionally along with a chain terminator and a branching agent such as those mentioned above in the presence of a catalyst such as that mentioned above, thereby to give a prepolymer, followed by further polymerizing the resulting prepolymer in a solid phase or in a swollen solid phase to complete a polycarbonate. In this process, the catalyst may be put in the prepolymerization system, or may be again added to the next polymerization system. The prepolymerization may be effected in any known manner. For example, the prepolymer may be prepared through ordinary interfacial prepolymerization, for which the catalyst may be added to the system in the next polymerization step. Preferred embodiments of the process and the conditions for them are described concretely hereunder.

(i) Prepolymerization:

A dihydroxy compound is reacted with a dicarbonate under heat to give a prepolymer while the aromatic monohydroxy compound resulting from the reaction is removed. The reaction maybe effected in a solvent inert to the reaction, for example, in methylene chloride, chloroform or the like, but, in general, it is effected in the absence of a solvent and in melt.

The ratio of the dicarbonate to the dihydroxy compound to be reacted (that is, to be fed into the reactor) varies, depending on the type of the compounds, the reaction temperature and also the other reaction conditions, but may fall generally between 0.9 and 2.5.

The amount of the catalyst to be added to the reaction system may fall generally between $10^{-8}$ and $10^{-1}$ mols, but preferably between $10^{-7}$ and $10^{-2}$ mols, more preferably between $10^{-6}$ and $10^{-3}$ mols, relative to one mol of the starting dihydroxy compound of the component (A). If its amount added is smaller than $10^{-8}$ mols, the catalyst could not exhibit its function; but if larger than $10^{-1}$ mols, the physical properties, especially the heat resistance and the hydrolysis resistance of the final product polycarbonate, will be poor.

The reaction temperature and the reaction time vary, depending on the type and the amount of the starting compounds and the catalyst used, on the necessary degree of polymerization of the prepolymer to be formed, and on the other reaction conditions. Preferably, however, the reaction temperature falls between 50 and 350° C., and the reaction time between 1 minute and 100 hours. In order not to color the prepolymer prepared, it is desirable that the temperature for the prepolymerization is as low as possible and the time for it is as short as possible. The prepolymer to be prepared through the prepolymerization may have a relatively low molecular weight. Under the condition defined above, colorless transparent prepolymers having the necessary degree of polymerization are easy to prepare. The reaction pressure preferably falls between 1 Torr and 5 kg/cm$^2$G.

It is desirable to prepare spherical prepolymers through the prepolymerization. For this, for example, a solution in an organic solvent of a polycarbonate prepolymer having been prepared separately may be put into a granulator that contains a powdery polycarbonate prepolymer prepared in the prepolymerization step, so that the powdery prepolymer is kept in contact with the prepolymer solution while the organic solvent is evaporated away from the solution. In that manner, the powdery prepolymer may be granulated into spherical grains.

Also preferably, the prepolymer may be processed with a solvent or may be heated to crystallize it.

(ii) Polymerization to Produce Polycarbonates:

The polycarbonate prepolymer prepared in the manner as above is thenpolymerized in a solid phase or in a swollen solid phase. The catalyst that may be used in the polymerization step is described above. The chain terminator to be used in the step is also described above.

(a) Polymerization in Solid Phase:

The crystallized solid prepolymer is further polymerized. The reaction could be promoted by removing the aromatic monohydroxy compound or the dicarbonate or both the two to be formed as side products, from the reaction system. For this, various methods are employable. One preferred method is to introduce some type of gas into the reaction system, with which the side products are removed from the reaction system. The gas includes, for example, inert gases such as nitrogen, argon, helium, carbon dioxide, etc.; gases of linear, branched or cyclic aliphatic hydrocarbon compounds having from 4 to 18 carbon atoms, such as pentane, hexane, heptane, cyclohexane, etc.; gases of ketones such as acetone, cyclohexane, etc.; gases of ethers such as dioxane, tetrahydrofuran, etc.; acetonitrile gas, etc. Another preferred method is to effect the reaction under reduced pressure. The two methods may be combined, if desired.

The shape of the crystalline prepolymer to be subjected to the solid-phase polymerization is not specifically defined, but preferred are pellets or beads of the prepolymer.

The reaction catalyst having been added to and still remaining in the prepolymerization system could act, as it would be, further in the solid-phase polymerization step, but, as the case may be, an additional catalyst such as that mentioned above may be added to the solid-phase polymerization system. The additional catalyst may be powdery, liquid or gaseous.

The reaction temperature and the reaction time for the polymerization may vary, depending on the conditions for it. Preferably, however, the reaction temperature falls between the glass transition point of the intended aromatic polycarbonate and a temperature at which the crystalline prepolymer being polymerized in a solid phase does not melt and could keep its solid phase; and the prepolymer may be heated at a temperature falling within the defined range for a period of time falling between 1 minute and 100 hours.

(b) Polymerization in Swollen Solid Phase:

The prepolymer prepared in the prepolymerization step is crystallized and then further polymerized in a solid phase while being swollen in a swelling gas. The swelling gas will be mentioned below.

This process includes a step of flaking the prepolymer prepared in the manner as above, and a molecular weight-increasing step of polymerizing the resulting flaky prepolymer in a solid phase in a swelling solvent stream (this is a swollen solid-phase polymerization step).

In the flaking step, the prepolymer is flaked in any conventional manner, for example, through rolling granulation, extrusion granulation or the like.

In the next, swollen solid-phase polymerization step, the prepolymer flakes are polymerized into a polymer having an increased molecular weight while they are kept in a solid phase. This step is characterized in that the flaky prepolymer is polymerized in a solid phase in a swelling solvent atmosphere while the side products, phenols are removed from the system. The advantages of the process including this step are that the intended polymerization could be effected at lower temperatures as compared with ordinary melt transesterification, and that the time for the polymerization could be significantly shortened as compared with that for ordinary solid-phase polymerization or melt transesterification.

The swelling solvent to be used herein is meant to include solvents capable of swelling polycarbonates under the reaction conditions that will be mentioned below; mixtures of two or more such solvents; and mixtures to be prepared by adding one or more of inert gases or poor solvents for polycarbonates to the solvents or their mixtures. The swollen condition in this step is meant to indicate that the starting prepolymer flakes are swollen by volume or weight at least to a degree not lower than the thermal swell thereof under the reaction conditions mentioned below. The swelling solvent is a single compound having a boiling point at which it can completely vaporize within the range of the following reaction conditions or having a vapor pressure of generally not lower than 50 mmHg under those reaction conditions, or a mixture of such compounds, and it can form the swollen condition defined above.

The swelling solvent for use herein is not specifically defined, so far as it satisfies the swelling conditions noted above. For example, aromatic compounds and oxygen-containing compounds having a solubility parameter of generally from 4 to 20 $(cal/cm^3)^{1/2}$, preferably from 7 to 14 $(cal/cm^3)^{1/2}$ belong to the category of the swelling solvent. Concretely, the swelling solvent includes, for example, aromatic compounds such as benzene, toluene, xylene, ethylbenzene, diethylbenzene, propylbenzene, dipropylbenzene, etc.; ethers such as tetrahydrofuran, dioxane, etc.; ketones such as methyl ethyl ketone, methyl isobutyl ketone, etc. Of those, preferred are single compounds of aromatic hydrocarbons having from 6 to 20 carbon atoms, and their mixtures.

Regarding its conditions, the poor solvent to be mixed with the swelling solvent shall be such that the solubility of the product polycarbonate in it is at most 0.1% by weight under the reaction conditions mentioned below and that it participates little in the reaction. Preferred examples of the poor solvent are linear, branched or cyclic aliphatic hydrocarbon compounds having from 4 to 18 carbon atoms such as pentane, hexane, heptane, octane, nonane, cyclohexane, etc.; ketones such as acetone, cyclohexanone, etc.; ethers such as dioxane, tetrahydrofuran, etc.; acetonitrile, etc. If the boiling point of the swelling solvent and that of the poor solvent are both above 250° C., the residual solvents will be difficult to remove from the product polycarbonate, and the quality of the product will be poor. Therefore, using solvents having such a high boiling point is unfavorable.

Where a mixture of the poor solvent and the swelling solvent is used herein, the proportion of the swelling solvent shall be at least 1% by weight of the mixed solvent, but preferably at least 5% by weight thereof.

In the swollen solid-phase polymerization step, the reaction temperature preferably falls between 100 and 240° C., and the reaction pressure preferably falls between 10 Torr and 5 kg/cm$^2$G, but is more preferably not higher than the atmospheric pressure. If the reaction temperature is lower than the defined range, the prepolymer could not undergo transesterification. On the other hand, however, if the reaction is effected at high-temperature conditions exceeding the melting point of the prepolymer, the reaction system could not keep a solid phase, and the prepolymer grains will fuse together at such high temperatures. If so, the operability to continue the reaction will be greatly lowered. Therefore, the reaction temperature must not be higher than the melting point of the prepolymer.

The reaction catalyst having been added to and still remaining in the prepolymerization system could act, as it would be, further in the swollen solid-phase polymerization step, but, as the case may be, an additional catalyst such as that mentioned above may be added to the swollen solid-phase polymerization system. The additional catalyst may be powdery, liquid or gaseous.

Regarding the mode of feeding the swelling solvent gas into the polymerization system, the liquid solvent may be directly fed into the reactor and is vaporized therein; or the liquid solvent is, after having been previously vaporized by the use of a heat exchanger or the like, fed into the reactor. The flow rate of the swelling gas solvent may be at least $1 \times 10^{-3}$ cm/sec, but is preferably at least $1 \times 10^{-3}$ cm/sec. The amount of the swelling gas to be fed into the reactor is preferably at least 0.5 liters (normal condition)/hr/g of prepolymer.

The polycarbonate of which the molecular weight has been increased in the manner as above may be dried and pelletized in any known manner. When an additive is added to the polymer product, some preferred methods are employed; for example, its powder may be directly added to the flaky product before or after the product is dried; or its liquid may be sprayed over the product; or its vapor may be applied thereto so that the product could absorb the additive vapor. Apart from the methods, the additive to be added thereto may be mixed with the polymer product in an extruder.

The blend ratio of the inert gas to the swelling solvent may be such that the swelling solvent accounts for at least 1% by volume of the mixed solvent gas, but preferably at least 5% by volume thereof.

(4) The polycarbonate produced in the manner mentioned above may be directly granulated, or may be molded by the use of an extruder or the like.

Before use, the polycarbonate may be compounded with any known additives such as plasticizers, pigments, lubricants, mold release agents, stabilizers, inorganic fillers, etc. Further if desired, any known antioxidant may be added to the reaction system. For use herein, preferred are phosphorus-containing antioxidants.

The polycarbonate may be blended with any other polymers such as polyolefins, polystyrenes, polyesters, polysulfonates, polyamides, polyphenylene ethers, etc. In particular, it can be combined with polyphenylene ethers terminated with any of OH, COOH, $NH_2$ and the like groups; terminal-modified polysiloxanes, modified polypropylenes, modified polystyrenes, etc.

2. Properties of Polycarbonates:

The viscosity-average molecular weight of the polycarbonates produced in the invention may fall between 10000 and 50000, but preferably between 11000 and 40000, more preferably between 12000 and 35000. Polycarbonates having a viscosity-average molecular weight of smaller than 10000 will have poor impact resistance; and those having a viscosity-average molecular weight of larger than 50000 will have poor fluidity and will be difficult to mold. The viscosity-average molecular weight of the polycarbonates for optical-disk substrates may fall between 10000 and 17000, but preferably between 11000 and 16000; and especially that of the polycarbonates for DVD substrates may fall between 10000 and 16000, but preferably between 11000 and 15000, more preferably between 12000 and 14500.

3. Optical-Disk Substrates:

For forming optical-disk substrates from the polycarbonates of the invention, employable are any ordinary molding methods including, for example, injection molding, extrusion molding, and even ultrasonic injection molding, multistage compression injection molding, rapid-charge injection molding, etc.

The molding temperature (cylinder temperature) may fall between 300 and 400° C.; and the mold temperature may fall between 80 and 140° C. If the molding temperature is higher than 400° C., the polycarbonates being molded will be degraded and will often lose their transparency at such high temperatures. The mold temperature is preferably higher in view of the fluidity of the polycarbonates, but if it is higher than 140° C., the substrates formed will be deformed.

The injection rate is preferably at least 150 cm³/sec, more preferably at least 200 cm³/sec. If it is smaller than 150 cm³/sec, the molding material will be cooled too rapidly in the mold so that the fluid pressure loss therein will increase. If so, the degree of orientation of the polycarbonates being molded will increase too much, and the resulting moldings will be unfavorably warped or will be even failures.

On the optical-disk substrates thus produced, a protective film and a recording film may be formed in a known film-forming process to give optical disks.

EXAMPLES

The invention is described in more detail with reference to the following Examples, which, however, are not intended to restrict the scope of the invention.

In the following Examples and Comparative Examples, the samples produced were evaluated according to the methods mentioned below.

Viscosity-Average Molecular Weight (Mv):

In an Ubbelohde's viscometer tube, the limiting viscosity [η] of a polymer solution in methylene chloride was measured at 20° C., and the viscosity-average molecular weight of the polymer was calculated according to the following relational formula:

$$[\eta] = 1.23 \times 10^{-5} \cdot Mv^{0.83}$$

Birefringence:

Measured with a double refraction measurement system, ADR-2000 from Oak. Some points to be measured were selected at random on the circumferences spaced by 30 mm, 40 mm and 50 mm from the center of a disk. The birefringence of the disk was evaluated in terms of the absolute value of the double-pass retardation in each point.

Drop-Weight Impact Ductile Fracture Rate:

An weight of 3.76 kg was dropped onto the position of 30 mm spaced from the center of a disk, at a dropping speed of 5.1 m/sec. Ten disks of the same type were tested in that manner, and the ratio of the ductile-fractured disks was obtained.

Izod Ductile Fracture Rate:

Pellets were molded into ten test pieces through injection molding. At 23° C. and 5° C., the test pieces were subjected to the impact test stipulated in JIS—K-7110, and the ratio of the ductile-fractured pieces was obtained.

Example 1

Production of Polycarbonate A 2283 g (10.0 mols) of bisphenol A (BPA), 2356 g (11.0 mols) of diphenyl carbonate, 103.2 g (0.50 mols) of 4-(1,1, 3,3-tetramethylbutyl)phenol, and tetramethylammonium hydroxide (its amount was $2.5 \times 10^{-4}$ mols relative to bisphenol A) and tetraphenylphosphonium tetraphenyl borate (its amount was $1.0 \times 10^{-5}$ mols relative to bisphenol A) both serving as a catalyst, were put into a 10-liter nickel-steel autoclave equippedwitha stirrer, and purged five times with argon. Next, the mixture was heated at 180° C., and reacted for 30 minutes in the argon atmosphere. This was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; then this was still further reacted at that temperature of 270° C. for 30 minutes with being vacuumed up to a vacuum degree of 1 mmHg; and finally, this was still further reacted at that temperature for 15 minutes with being vacuumed up to a vacuum degree of 0.5 mmHg.

After the reaction, the reactor was restored with argon to have an atmospheric pressure, and the product formed therein was taken out. While still in melt, this was introduced into a double-screw extruder via a gear pump, and pelletized therethrough. The polymer thus produced had a viscosity-average molecular weight (Mv) of 13400.

Using a molding machine, Meiki Seisakusho's M-35B-D-DM (this is an injection-molding machine for disks only), the resulting pellets were molded into DVD substrates at a cylinder temperature of 370° C., at a mold temperature of 100° C. and under a clamp pressure of 16.5 tons.

The DVD substrates were tested for the birefringence and the drop-weight impact ductile fracture rate. The data were as follows:

<1> Birefringence:

Retardation in the point of 30 mm: 30 nm

Retardation in the point of 40 mm: 20 nm

Retardation in the point of 50 mm: 0 nm

<2> Drop-Weight Impact Ductile Fracture Rate:

All ten disks tested were ductile-fractured, and the drop-weight impact ductile fracture rate of the substrates produced herein was 100%.

Comparative Example 1

Production of Polycarbonate a

The same process as in Example 1 was repeated, except that 4-(1,1,3,3-tetramethylbutyl)phenol was not added to the reaction system. The polymer produced herein had a viscosity-average molecular weight (Mv) of 13600. This was tested and evaluated in the same manner as in Example 1.

<1> Birefringence:

Retardation in the point of 30 mm: 32 nm

Retardation in the point of 40 mm: 21 nm

Retardation in the point of 50 mm: 3 nm

<2> Drop-Weight Impact Ductile Fracture Rate:

All ten disks tested were not ductile-fractured but were brittle-fractured. The drop-weight impact ductile fracture rate of the substrates produced herein was 0%.

The data in Example 1 and Comparative Example 1 indicate the following:

The polymer of Example 1 and that of Comparative Example 1 both had a high viscosity-average molecular weight on the same level, and the birefringence of the two was reduced to the same degree. However, the drop-weight impact ductile fracture rate of the substrates produced in Comparative Example 1 was 0, from which it is understood that the substrates produced in Comparative Example 1 were not ductile-fractured and their impact resistance is poor.

Example 2

Production of Polycarbonate B

The same process as in Example 1 was repeated, except that the monomers were reacted for 30 minutes but not for 15 minutes at the vacuum degree of 0.5 mmHg in the final step. The polymer produced herein had a viscosity-average molecular weight of 17200. The polymer was pelletized in the same manner as in Example 1, and the resulting pellets were formed into Izod impact test pieces. The Izod ductile fracture rate of the test pieces was as follows:
   <1> Izod ductile fracture rate at 23° C.: 100%
   <1> Izod ductile fracture rate at 5° C.: 100%

Comparative Example 2

Production of Polycarbonate b

The same process as in Comparative Example 1 was repeated, except that the monomers were reacted for 30 minutes but not for 15 minutes at the vacuum degree of 0.5 mmHg in the final step. The polymer produced herein had a viscosity-average molecular weight of 17500. This was tested in the same manner as in Example 2. The Izod ductile fracture rate of the test pieces of the polymer was as follows:
   <1> Izod ductile fracture rate at 23° C.: 40%
   <1> Izod ductile fracture rate at 5° C.: 0%

The data in Example 2 and Comparative Example 2 indicate the following:

The polymer of Example 2 and that of Comparative Example 2 both had a high viscosity-average molecular weight on the same level, but the Izod ductile fracture rate of the test pieces produced in Comparative Example 2 was low. From this, it is understood that the test pieces produced in Comparative Example 2 were not ductile-fractured and their impact resistance is poor.

Example 3

Solid-Phase Polymerization 2283 g (10.0 mols) of bisphenol A (BPA), 2356 g (11.0 mols) of diphenyl carbonate (DPC), 103.2 g (0.50 mols) of 4-(1,1,3,3-tetramethylbutyl) phenol, and tetramethylammonium hydroxide (its amount was $2.5 \times 10^{-4}$ mols relative to bisphenol A) serving as a catalyst were put into a 10-liter nickel autoclave equipped with a stirrer, and purged five times with argon. Next, the mixture was heated at 180° C., and reacted for 30 minutes in the argon atmosphere. This was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; and finally this was still further reacted at that temperature of 270° C. for 30 minutes with being vacuumed up to a vacuum degree of 1 mmHg. After the reaction, the reactor was restored with argon to have an atmospheric pressure, and the product, prepolymer formed therein was taken out, and ground. The prepolymer had a viscosity-average molecular weight (Mv) of 8800, and its terminal hydroxyl fraction was 30%.

The thus-obtained prepolymer, and cyclohexyltriphenylphosphonium tetraphenyl borate (its amount was $1.0 \times 10^{-5}$ mol relative to bisphenol A) serving as a catalyst for solid-phase polymerization were dissolved in methylene chloride, to which was added n-heptane to give a powdery deposit. This was concentrated and dried up to solid, and the solid was further dried in vacuum to obtain a powdery prepolymer. 2 kg g of the powdery prepolymer was charged into a SUS tube, and heated from room temperature up to 240° C. while nitrogen gas was introduced thereinto at a flow rate of 100 ml/min. In that condition, the prepolymer was polymerized in a solid phase for 2 hours to obtain a polycarbonate. The polycarbonate had a viscosity-average molecular weight (Mv) of 17500. The flaky PC was pelletized in the same manner as in Example 1, and the resulting pellets were formed into Izod impact test pieces. The Izod ductile fracture rate of the test pieces was as follows:
   <1> Izod ductile fracture rate at 23° C.: 100%
   <2> Izod ductile fracture rate at 5° C.: 100%

Comparative Example 3

Solid-Phase Polymerization

The same process as in Example 3 was repeated, except that 4-(1,1,3,3-tetramethylbutyl)phenol was not used. The polycarbonate produced herein had a viscosity-average molecular weight (Mv) of17000. The Izod ductile fracture rate of the test pieces of the polymer was as follows:
   <1> Izod ductile fracture rate at 23° C.: 30%
   <2> Izod ductile fracture rate at 5° C.: 0%

The data in Example 3 and Comparative Example 3 indicate the following:

The polymer of Example 3 and that of Comparative Example 3 both had a high viscosity-average molecular weight on the same level, but the Izod ductile fracture rate of the test pieces of Comparative Example 3 was low. From this, it is understood that the test pieces of Comparative Example 3 were not ductile-fractured and their impact resistance is poor.

Example 4

Solid-Phase Polymerization in Poor Solvent

The same process as in Example 3 was repeated to obtain a polycarbonate, except that pre-heated n-heptane gas but not nitrogen gas was introduced into the reaction system at a flow rate of 100 ml/ml. In this, the gaseous component having passed through the reactor tube was cooled and recovered. The polycarbonate had a viscosity-average molecular weight (Mv) of 17300. The flaky PC was pelletized in the same manner as in Example 1, and the resulting pellets were formed into Izod impact test pieces. The Izod ductile fracture rate of the test pieces was as follows:
   <1> Izod ductile fracture rate at 23° C.: 100%
   <2> Izod ductile fracture rate at 5° C.: 100%

Comparative Example 4

Solid-Phase Polymerization in Poor Solvent

The same process as in Example 4 was repeated, except that 4-(1,1,3,3-tetramethylbutyl)phenol was not used. The polycarbonate produced herein had a viscosity-average molecular weight (Mv) of 17100. The Izod ductile fracture rate of the test pieces of the polycarbonate was as follows:
   <1> Izod ductile fracture rate at 23° C.: 30%
   <2> Izod ductile fracture rate at 5° C.: 0%

The data in Example 4 and Comparative Example 4 indicate the following:

The polymer of Example 4 and that of Comparative Example 4 both had a high viscosity-average molecular weight on the same level, but the Izod ductile fracture rate of the test pieces of Comparative Example 4 was low. From this, it is understood that the test pieces of Comparative Example 4 were not ductile-fractured and their impact resistance is poor.

Example 5

Swollen Solid-Phase Polymerization 2 kg of the powdery prepolymer having been prepared in the same manner as in Example 3 was charged into a SUS tube, and heated from room temperature up to 240° C. while paraxylene gas was introduced thereinto. In that condition, the prepolymer was polymerized in a swollen solid phase for 2 hours to obtain a polycarbonate. The polycarbonate had a viscosity-average molecular weight (Mv) of 17000. The flaky polycarbonate was pelletized in the same manner as in Example 1, and the resulting pellets were formed into Izod impact test pieces. The Izod ductile fracture rate of the test pieces was as follows:

<1> Izod ductile fracture rate at 23° C.: 100%
<2> Izod ductile fracture rate at 5° C.: 100%

Comparative Example 5

Swollen Solid-Phase Polymerization

The same process as in Example 5 was repeated, except that 4-(1,1,3,3-tetramethylbutyl)phenol was not used. The polycarbonate produced herein had a viscosity-average molecular weight (Mv) of 17100. The Izod ductile fracture rate of the test pieces of the polycarbonate was as follows:

<1> Izod ductile fracture rate at 23° C.: 30%
<2> Izod ductile fracture rate at 5° C.: 0%

The data in Example 5 and Comparative Example 5 indicate the following:

The polymer of Example 5 and that of Comparative Example 5 both had a high viscosity-average molecular weight on the same level, but the Izod ductile fracture rate of the test pieces of Comparative Example 5 was low. From this, it is understood that the test pieces of Comparative Example 5 were not ductile-fractured and their impact resistance is poor.

INDUSTRIAL APPLICABILITY

According to the process for producing polycarbonates of the invention, obtained are polycarbonates having well-balanced fluidity and impact resistance. In the process, toxic phosgene is not used as the starting material. The polycarbonates thus produced in the process can be molded into optical-disk substrates having reduced birefringence and improved impact resistance.

What is claimed is:

1. An optical-disk substrate produced by molding a polycarbonate prepared by a process which comprises transesterifying a dicarbonate with a dihydroxy compound in the presence of a compound having a structure of the following general formula (1) and serving as a chain terminator:

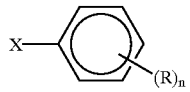

(1)

wherein X represents —OH, —COOH, —COCl or —NH$_2$; R represents an alkyl group having a branched structure with from 5 to 20 carbon atoms; and n indicates an integer of from 1 to 5.

2. The optical-disk substrate as claimed in claim 1, wherein the transesterification of the dicarbonate with the dihydroxy compound is effected in the presence of at least one catalyst selected from the group consisting of nitrogen-containing organic basic compounds and phosphorus-containing basic compounds.

3. An optical-disk substrate produced by molding a polycarbonate prepared by a process which comprises preparing a polycarbonate prepolymer through prepolymerization of a dihydroxy compound with a dicarbonate followed by polymerizing the resulting prepolymer in a solid phase or in a swollen solid phase in the presence of a compound having a structure of the following general formula (1) and serving as a chain terminator:

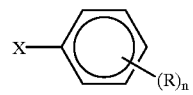

(1)

wherein X represents —OH, —COOH, —COCl or —NH$_2$; R represents an alkyl group having a branched structure with from 5 to 20 carbon atoms; and n indicates an integer of from 1 to 5.

4. The optical-disk substrate as claimed in claim 3, wherein the prepolymerization of the dihydroxy compound with the dicarbonate to give a polycarbonate prepolymer followed by the polymerization of the resulting prepolymer in a solid phase or in a swollen solid phase is effected in the presence of at least one catalyst selected from the group consisting of nitrogen-containing organic basic compounds and phosphorous-containing basic compounds.

5. The optical-disk substrate as claimed in claim 2, wherein the phosphorous-containing basic compounds are quaternary phosphonium salts.

6. The optical-disk substrate as claimed in claim 4, wherein the phosphorous-containing basic compounds are quaternary phosphonium salts.

7. A digital video disk or digital versatile disk comprising the optical-disk substrate as claimed in claim 1.

8. A digital video disk or digital versatile disk comprising the optical-disk substrate as claimed in claim 2.

9. A digital video disk or digital versatile disk comprising the optical-disk substrate as claimed in claim 3.

10. A digital video disk or digital versatile disk comprising the optical-disk substrate as claimed in claim 4.

11. A digital video disk or digital versatile disk comprising the optical-disk substrate as claimed in claim 5.

12. A digital video disk or digital versatile disk comprising the optical-disk substrate as claimed in claim 6.

* * * * *